United States Patent [19]
Lee et al.

[11] 3,920,225
[45] Nov. 18, 1975

[54] CENTRIFUGAL CHEMICAL MIXER

[75] Inventors: Merle D. Lee; Lloyd R. Lee, both of Hackettstown, N.J.

[73] Assignee: The Raymond Lee Organization, Inc., New York, N.Y. ; a part interest

[22] Filed: Oct. 1, 1974

[21] Appl. No.: 511,043

[52] U.S. Cl. .............................................. 259/22
[51] Int. Cl.² ...................... B01F 7/02; B01F 15/02
[58] Field of Search .............. 259/23, 21, 22, 24, 6, 259/7, 8, 96, 5, 25, 26, 41, 42, 43; 137/604

[56] References Cited
UNITED STATES PATENTS

| | | | |
|---|---|---|---|
| 931,153 | 8/1909 | Silberhorn | 259/23 |
| 2,392,542 | 1/1946 | Matuszak | 259/7 |
| 2,501,467 | 3/1950 | Ittner | 259/23 |
| 2,892,619 | 6/1959 | Thurman | 259/7 |
| 3,415,493 | 12/1968 | Bates | 259/7 |

*Primary Examiner*—Robert W. Jenkins
*Attorney, Agent, or Firm*—Daniel Jay Tick

[57] ABSTRACT

A centrifugal chemical mixer comprises a tube rotatably mounted in a pipe fitting through which sludge passes for rotation about the axis of the tube. The tube extends into the pipe fitting at an angle relative to the axis of the pipe fitting and has a closed end in the pipe fitting and a plurality of radially extending holes therein for flinging a chemical outward from the tube at the closed end thereof. A motive device is coupled to the tube for rotating it. A feed device supplies a chemical into the tube whereby rotation of the tube evenly distributes the chemical centrifugally into sludge in the pipe fitting.

2 Claims, 1 Drawing Figure

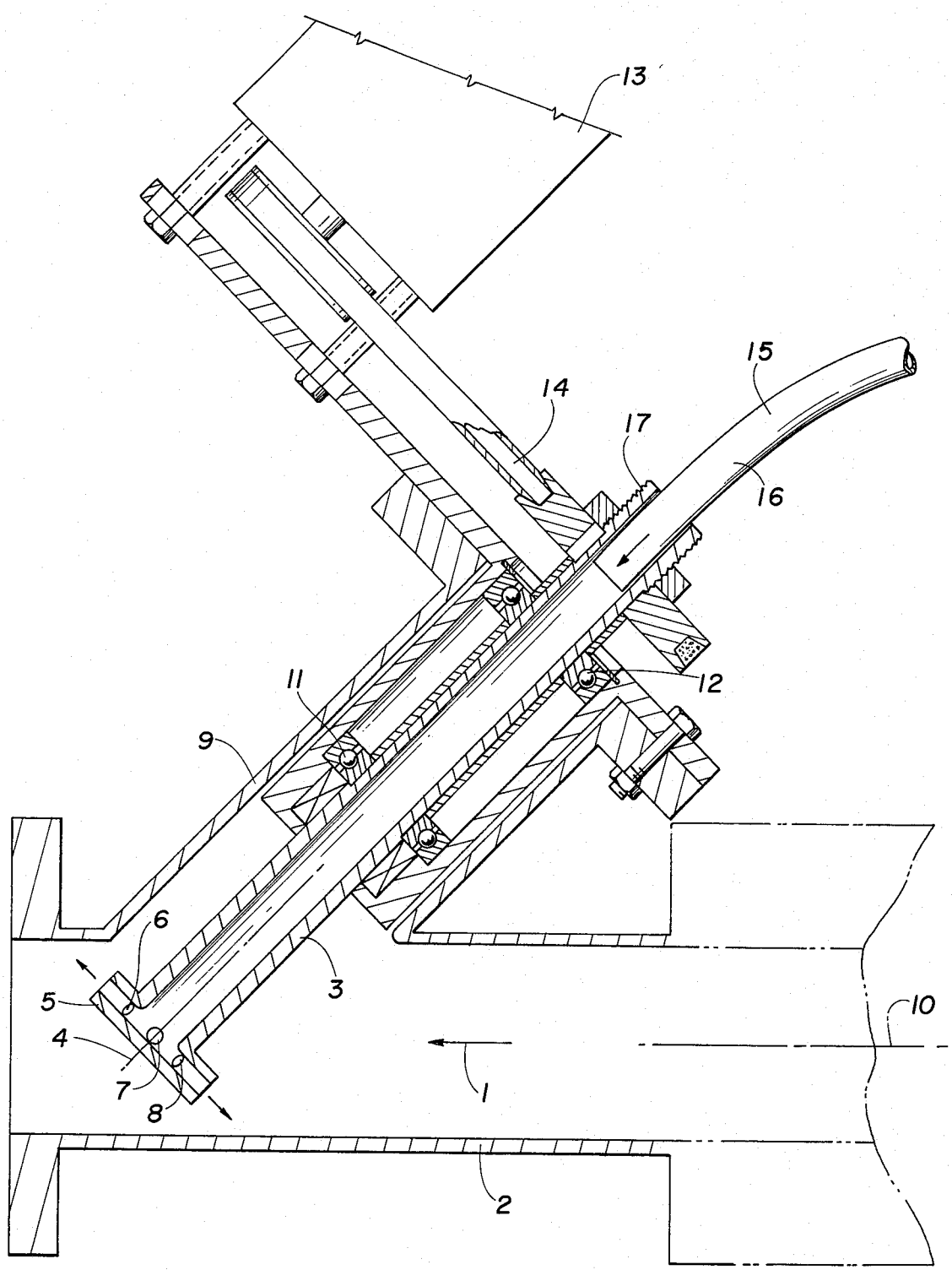

CENTRIFUGAL CHEMICAL MIXER

DESCRIPTION OF THE INVENTION

The present invention relates to a centrifugal chemical mixer. More particularly, the invention relates to a centrifugal chemical mixer for evenly distributing a chemical in sludge passing through a pipe fitting.

Objects of the invention are to provide a centrifugal chemical mixer which is installed with facility and convenience in new and existing pipe fittings through which sludge passes, and functions efficiently, effectively and reliably to evenly distribute a chemical in sludge passing through a pipe fitting.

In order that the invention may be readily carried into effect, it will now be described with reference to the accompanying drawing, wherein the single FIGURE is a view, partly in section, of an embodiment of the centrifugal chemical mixer of the invention.

The centrifugal chemical mixer of the invention functions to evenly distribute a chemical in sludge, indicated by an arrow 1, passing through a pipe fitting 2.

The centrifugal chemical mixer of the invention comprises a tube 3 rotatably mounted in the pipe fitting 2 for rotation about its axis 4. The tube 3 extends into the pipe fitting 2 at an angle relative to the axis 4 of the pipe fitting. The tube 3 has a closed end 5 in the pipe fitting 2 and a plurality of substantially radially extending holes 6, 7, 8, and so on, therein for flinging a chemical outward from the tube at the closed end thereof.

The pipe fitting 2 has an arm 9 extending substantially 45° relative to the axis 10 of the pipe fitting and the tube 3 is rotatably mounted substantially coaxially in the arm. The tube 3 is rotatably mounted in the arm 9 by any suitable means such as, for example, sealed bearings 11 and 12 of any suitable type.

A motive device is coupled to the tube 3 for rotating the tube. The motive device may comprise any suitable known device for driving the tube 3 in rotation about its axis 4. Thus, for example, a motive device may comprise an electric motor 13 coupled to the tube 3 via a drive belt 14.

A feed device 15 supplies a chemical into the tube 3 whereby rotation of the tube evenly distributes the chemical centrifugally into sludge in the pipe fitting 2. The feed device 15 comprises a stationary feed tube 16 opening into the tube 3 at an open end 17 of the tube 3 opposite the closed end 5 thereof.

While the invention has been described by means of a specific example and in a specific embodiment, we do not wish to be limited thereto, for obvious modifications will occur to those skilled in the art without departing from the spirit and scope of the invention.

We claim:

1. The combination of a pipe fitting and a centrifugal chemical mixer for evenly distributing a chemical in sludge passing through the pipe fitting, said combination comprising a pipe fitting having an arm extending substantially 45° relative to the axis of the pipe fitting;

a centrifugal chemical mixer comprising a tube rotatably mounted substantially coaxially in the arm of the pipe fitting for rotation about its axis and extending into the pipe fitting at an angle relative to the axis of the pipe fitting, said tube having a closed end in the pipe fitting and a plurality of substantially radially extending holes therein for flinging a chemical outward from the tube at the closed end thereof;

motive means coupled to the tube for rotating the tube; and feed means for supplying a chemical into the tube whereby rotation of the tube evenly distributes the chemical centrifugally into sludge in the pipe fitting.

2. A centrifugal chemical mixer as claimed in claim 1, wherein the feed means comprises a stationary feed tube opening into the tube at an open end of the tube opposite the closed end thereof.

* * * * *